(12) United States Patent
Shankar et al.

(10) Patent No.: US 10,089,511 B2
(45) Date of Patent: Oct. 2, 2018

(54) METHOD AND APPARATUS FOR GENERATING MULTI-SYMBOLOGY VISUAL DATA CAPTURE FEEDBACK

(71) Applicant: SYMBOL TECHNOLOGIES, LLC, Lincolnshire, IL (US)

(72) Inventors: Raghavendra Tenkasi Shankar, Holbrook, NY (US); Kalugama Gardialge Akila Buddika Peiris, Holbrook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 67 days.

(21) Appl. No.: 15/449,304

(22) Filed: Mar. 3, 2017

(65) Prior Publication Data

US 2018/0253580 A1    Sep. 6, 2018

(51) Int. Cl.
| | | |
|---|---|---|
| *G06K 19/00* | (2006.01) |
| *G06K 7/14* | (2006.01) |
| *G09G 5/377* | (2006.01) |
| *G06K 19/06* | (2006.01) |
| *G06K 7/10* | (2006.01) |

(52) U.S. Cl.
CPC ....... *G06K 7/1447* (2013.01); *G06K 7/10881* (2013.01); *G06K 7/1417* (2013.01); *G06K 19/06037* (2013.01); *G09G 5/377* (2013.01); *G09G 2340/12* (2013.01)

(58) Field of Classification Search
USPC ................................. 235/435, 439, 454, 462
See application file for complete search history.

(56) References Cited

U.S. PATENT DOCUMENTS

2002/0104884 A1* 8/2002 Meier ................ G06K 7/10712
235/462.25

\* cited by examiner

*Primary Examiner* — Matthew Mikels

(57) ABSTRACT

A method of generating visual data capture feedback at a data capture device includes rendering first and second applications on respective portions of a display of the data capture device. Each of the first and second applications are configured to process data decoded from captured indicia. A memory of the capture device stores configuration data including a first symbology indicator corresponding to a data symbology handled by the first application, and a second symbology indicator corresponding to a data symbology handled by the second application. Responsive to capturing an indicium, the method includes selecting a target application from the first and second applications for processing data decoded from the captured indicium in accordance with one of the first and second data symbology, based on the configuration data; and rendering a visual feedback element on the display within a target portion of the display corresponding to the selected target application.

14 Claims, 8 Drawing Sheets

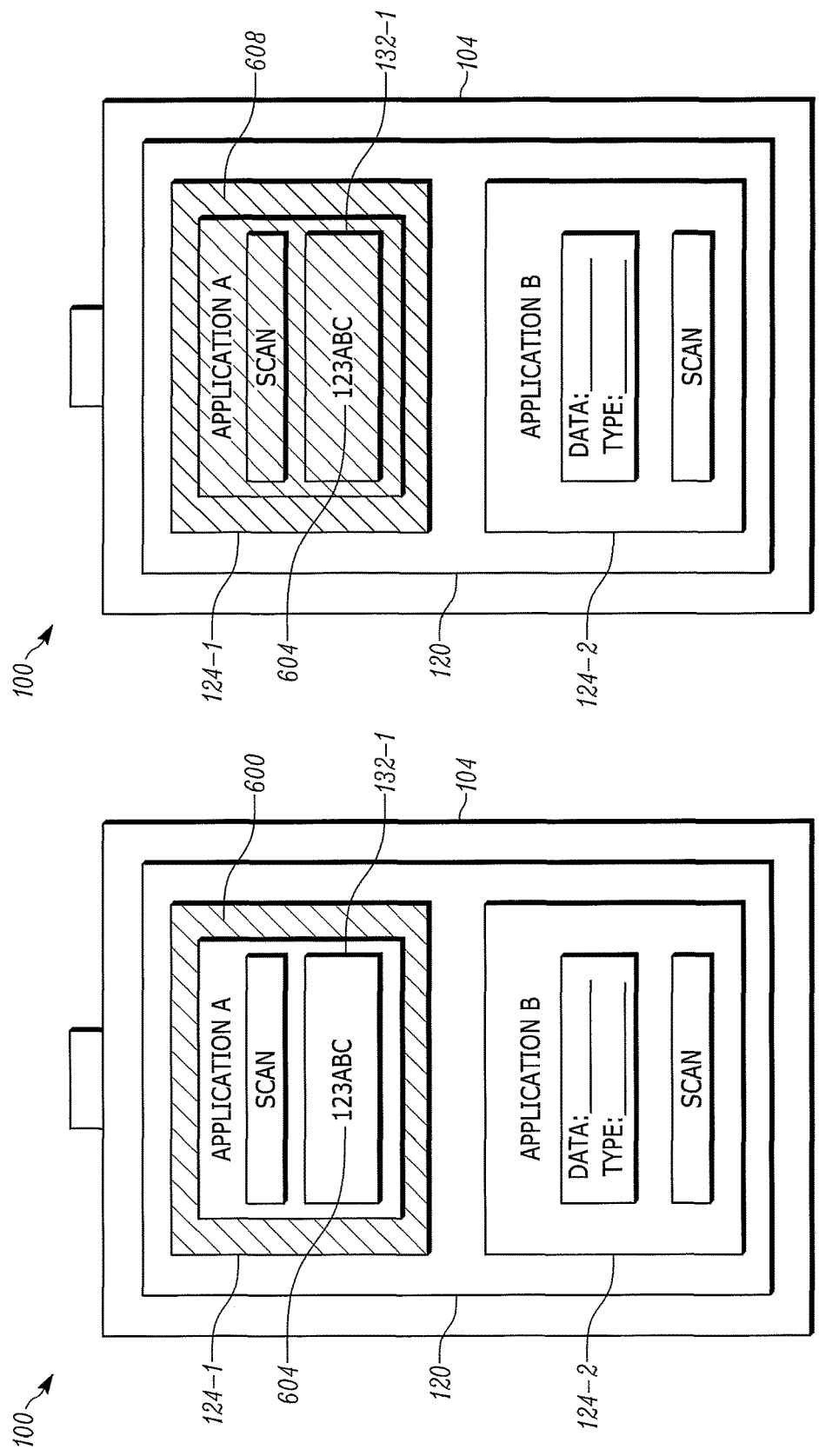

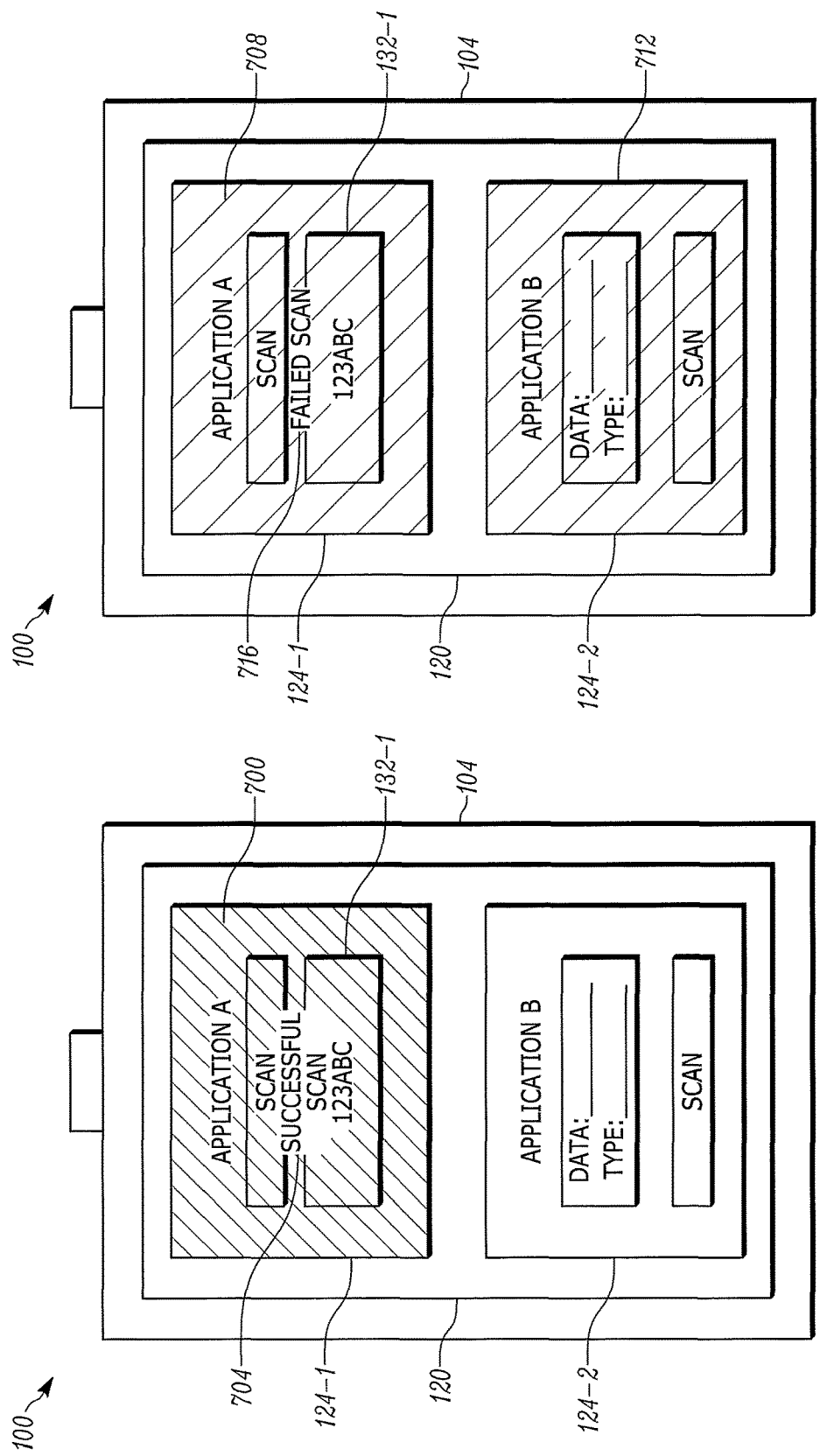

METHOD AND APPARATUS FOR GENERATING MULTI-SYMBOLOGY VISUAL DATA CAPTURE FEEDBACK

BACKGROUND OF THE INVENTION

Data capture devices, such as handheld barcode scanners, may be deployed in a variety of environments, including warehouse management, retail checkout operations, and the like. Each such environment may employ a different barcode symbology to be processed by the data capture devices. A given data capture device may be employed in more than one such environment, and may therefore be required to process a number of different barcode symbologies. Typical data capture devices are unable to efficiently alert operators as to their current state when deployed in environments where multiple active applications are employed to handle different symbologies.

Accordingly, there is a need for a method and apparatus for generating multi-symbology visual data capture feedback.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 6A-6B are schematics of visual data capture feedback generated by the data capture device of FIG. 1 in accordance with other embodiments.

FIGS. 7A-7B are schematics of visual data capture feedback generated by the data capture device of FIG. 1 in accordance with further embodiments.

Figure 1:
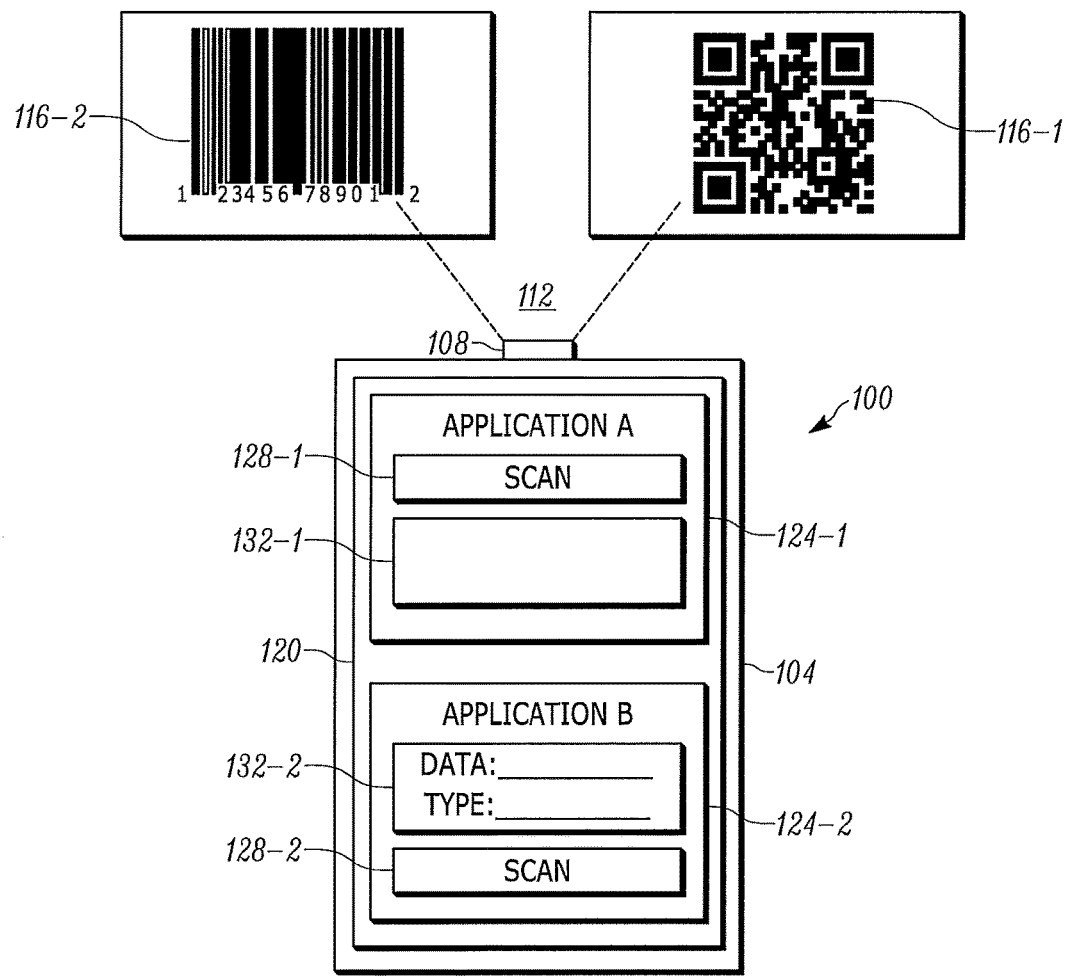
FIG. 1 is a schematic of a data capture device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Machine-readable indicia, also generally referred to as barcodes herein, are employed in a variety of environments (e.g. warehousing, retail, advertising and the like). Various types of barcodes are available, each referred to as a distinct symbology. Each symbology, as discussed herein, refers to both the physical appearance of a barcode and the format of data encoded by the barcode. For example, the UPC-A (Universal Product Code) symbology, as will now be apparent to those skilled in the art, defines an array of black bars and white spaces (that is, the barcode) encoding a string of twelve digits identifying certain attributes of a product or other item (that is, the format of the encoded data).

Data capture devices generally include modules such as image sensors, laser emitters and reflectors, and the like, configured to capture barcodes and decode the data encoded therein. A data capture device deployed in an environment where a plurality of barcode symbologies are used may also include distinct components (e.g. computer executable applications) for handling each symbology. Two or more such components may be active at a given time, and thus may share control of a display of the data capture device. Simultaneous activity of multiple barcode-handling components may complicate the processing of captured barcodes, and may also reduce the efficacy of typical operator alerts generated in response to capturing a barcode, such as audible tones generated by the data capture device.

Examples disclosed herein are directed to a method of generating visual data capture feedback at a data capture device. The method includes rendering graphical user interfaces for first and second applications on respective portions of a display of the data capture device. Each of the first and second applications are configured to process data decoded from captured indicia. A memory of the capture device stores configuration data including a first symbology indicator corresponding to a data symbology handled by the first application, and a second symbology indicator corresponding to a data symbology handled by the second application. Responsive to capturing an indicium, the method includes selecting a target application from the first and second applications for processing data decoded from the captured indicium in accordance with one of the first and second data symbology, based on the configuration data; and rendering a visual feedback element on the display within a target portion of the display corresponding to the selected target application.

FIG. 1 depicts an example data capture device 100 in accordance with the teachings of this disclosure. The device 100 includes a housing 104 supporting the various other components discussed herein. In some examples, the housing 104 is a unitary structure supporting all other components of the device 100. In other examples, the housing 104 is implemented as two or more distinct (e.g. separable) housing components, such as a first component comprising a pistol-grip handle including a cradle configured to receive a second component comprising the housing of a smartphone, tablet computer, or the like.

The housing 104 supports a data capture module 108 configured to capture indicia within a field of view 112. The data capture module 108 includes any suitable one of, or any suitable combination of, imaging sensors, light emitters, reflectors and the like enabling the data capture module 108 to capture indicia having at least two distinct symbologies. In the example illustrated in FIG. 1, a first indicium 116-1 and a second indicium 116-2—collectively referred to as the indicia 116, and generically referred to as an indicium 116—are illustrated, each affixed to items such as product packaging. The indicium 116-1 is a two-dimensional barcode (in particular, a QR Code™) and the indicium 116-2 is a linear barcode (in particular, a UPC-A barcode). As will now be apparent, the above-mentioned symbologies for the indicia 116 are referred to for the purpose of illustration; the data capture module 108 can also be enabled to capture any of a wide variety of other symbologies (e.g. Code 39, PDF417, Datamatrix and the like).

The data capture device 100 also includes a display 120 supported by the housing 104. The display 120 is a flat-panel display, such as an organic light-emitted diode-based display (e.g. an active-matrix OLED, or AMOLED, display). In other examples, however, the display 120 can be implemented with any of a wide variety of display technologies. The display is under the control of additional components of the device 100, discussed in further detail below. Under the control of the above-mentioned components, the display 120 simultaneously renders a first application in a first window 124-1 and a second application in a second window 124-2. The application windows 124 occupy respective portions of the display 120. In other examples, more than two application windows are rendered on the display 120.

The graphical user interfaces of the applications rendered in the windows 124 are barcode handling applications executed by the device 100. In this example, the application rendered in the window 124-1 is a checkout application configured to handle barcodes having the same symbology as the indicium 116-2, and the application rendered in the window 124-2 is an inventory picking application configured to handle barcodes having the same symbology as the indicium 116-1. Each of the applications includes interface elements such as selectable "scan" buttons 128-1 and 128-2 for initiating a capture operation by the data capture module 108, and a data window 132-1 and 132-2 for rendering data decoded from a captured indicium. In other embodiments, a single universal selectable "scan" button is rendered on the display 120 in place of the buttons 128, for instance by an intermediate application. The applications rendered in the windows 124 as illustrated in FIG. 1 are illustrative examples of barcode handling applications. In other examples, the applications include different sets of interface elements, and perform other processing actions instead of or in addition to those mentioned above.

Figure 2:
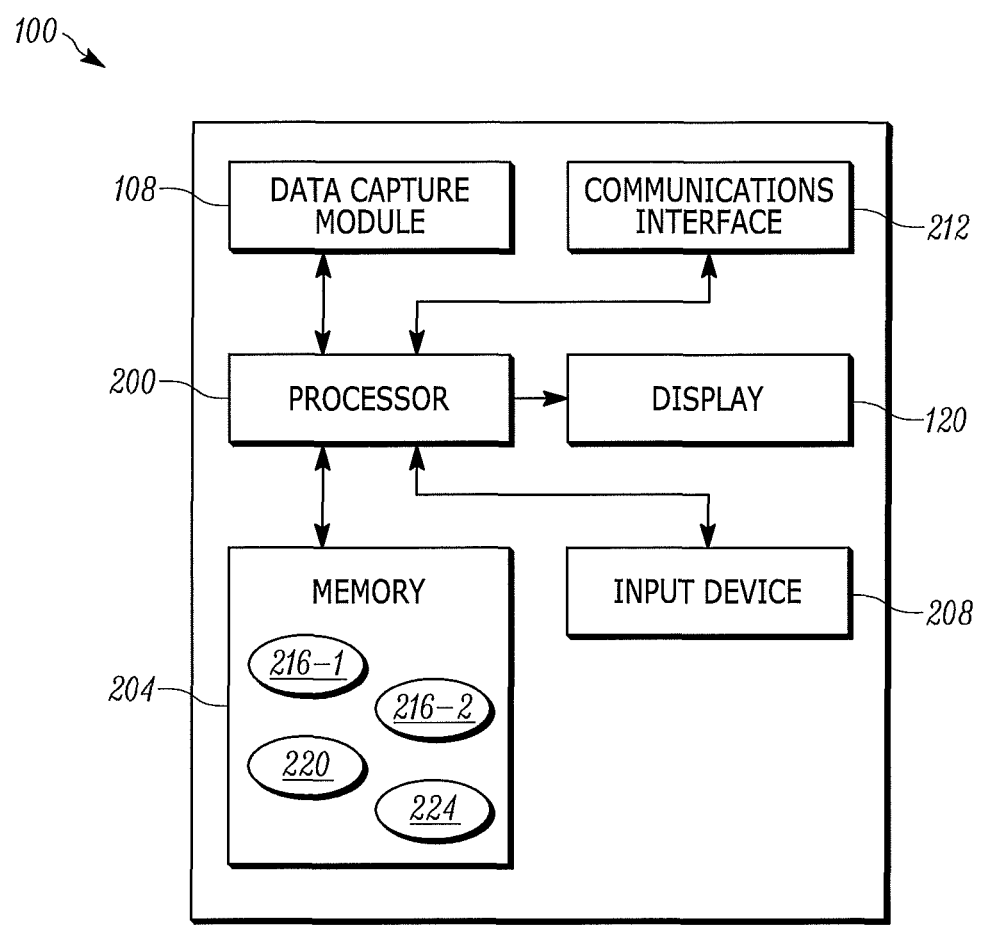
FIG. 2 is a block diagram of certain internal hardware components of the data capture device of FIG. 1.

As will be described below, the device 100 includes components configuring the display 120 to generate visual feedback in response to data capture operations initiated by the data capture module 108 (FIG. 2). In particular, the visual feedback indicates which of the applications rendered on the display 120 have received data decoded from the captured indicium for further processing.

Referring to FIG. 2, a schematic diagram of internal components of the device 100 is shown. The device 100 includes a central processing unit (CPU), also referred to as a processor 200, interconnected with a non-transitory computer readable storage medium, such as a memory 204. The memory 204 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 200 and the memory 204 each comprise one or more integrated circuits.

The data capture device 100 also includes at least one input device 208 interconnected with the processor 200. As will be apparent to those skilled in the art, the input device 208 is configured to receive input and provide data representative of the received input to the processor 200. In one embodiment, the input device 208 includes a trigger supported by the housing 104, in response to the actuation of which the processor 200 controls the data capture module 108 to initiate capture of an indicium 116. In the present embodiment, the input device 208 also includes a touch screen integrated with the display 120 that renders scan buttons 128-1 and 128-2, as discussed in FIG. 1 above. In other examples, the input device 208 includes other input hardware in addition to or instead of the above-mentioned trigger and touch screen. Other examples of input hardware include a microphone, a keypad, and the like.

The device 100 also includes at least one output device interconnected with the processor 200. The output device includes the display 120, mentioned above. In other examples (not shown), the output device also includes any one of, or any suitable combination of, a speaker, a notification LED, and the like.

The device 100 also includes a communications interface 212 interconnected with the processor 200. In one embodiment, the processor 200 is a specially designed data capture processor optimized for data capture applications. The communications interface 212 includes any suitable hardware (e.g. transmitters, receivers, network interface controllers and the like) allowing the device 100 to communicate with other computing devices via a link with a network or with the other computing devices themselves. The specific components of the communications interface 212 are selected based on the type of network or other links that the device 100 is required to communicate over. For example, in the present example, the communications interface 212 includes a wireless transceiver based on the Bluetooth™ standard. In other examples, the communications interface 212 includes, in addition to or instead of the above-mentioned transceiver, transceivers or other control hardware for communicating over WiFi links, wired links (e.g. Ethernet), cell phone networks and the like.

The various components of the device 100 are interconnected, for example via one or more communication buses. The device 100 also includes a power source (not shown) for supplying the above-mentioned components with electrical power. In the present example, the power source includes a battery; in other examples, the power source includes a wired connection to a wall outlet or other external power source in addition to or instead of the battery.

The memory 204 stores a plurality of applications, each including a plurality of computer readable instructions executable by the processor 200. The execution of the above-mentioned instructions by the processor 200 causes the device 100 to implement certain functionality discussed herein. Each application is therefore said to be configured to perform that functionality in the discussion below.

In the present example, the memory 204 stores computer executable instructions corresponding to barcode handling applications 216-1 and 216-2 having graphical user interfaces rendered in windows 124-1 and 124-2 shown in FIG. 1, respectively. Although two barcode handling applications 216, also referred to herein as barcode handlers 216, are illustrated in FIG. 2, in other examples any suitable number of barcode handlers can be stored in the memory 204 for execution by the processor 200. In general, each barcode handler 216 is configured to perform a set of functions associated with the environment in which the device 100 is deployed. In the present example, as mentioned above, the barcode handler 216-1 is a checkout application, and thus is configured to obtain decoded data from an indicium (e.g. the indicium 116-2) and query a data source such as a server connected to the device 100 via the communications interface 212 for a price associated with the indicium 116-2. As also mentioned above, the barcode handler 216-2 is an inventory picking application, and is thus configured to receive a list of items to be picked, to compare data obtained from an indicium (e.g. the indicium 116-2) with the list, and to update the list as necessary. Various other functions for barcode handlers will now be apparent to those skilled in the art.

The memory 204 also stores a scanning framework application 220 and an operating system 224. The scanning framework 220 is configured to control access to the data capture module 108 on behalf of the barcode handlers 216 in order to initiate a data capture operation, decode an indicium captured by the data capture module 108, and direct the decoded data to one or more of the barcode handlers 216. Together with the barcode handlers 216, the scanning framework 220 is also configured to enable the generation of visual data capture feedback via the display 120. The operating system 224 implements various supporting functions employed by the barcode handlers 216 and the scanning framework 220, as will be discussed below.

Figure 3:
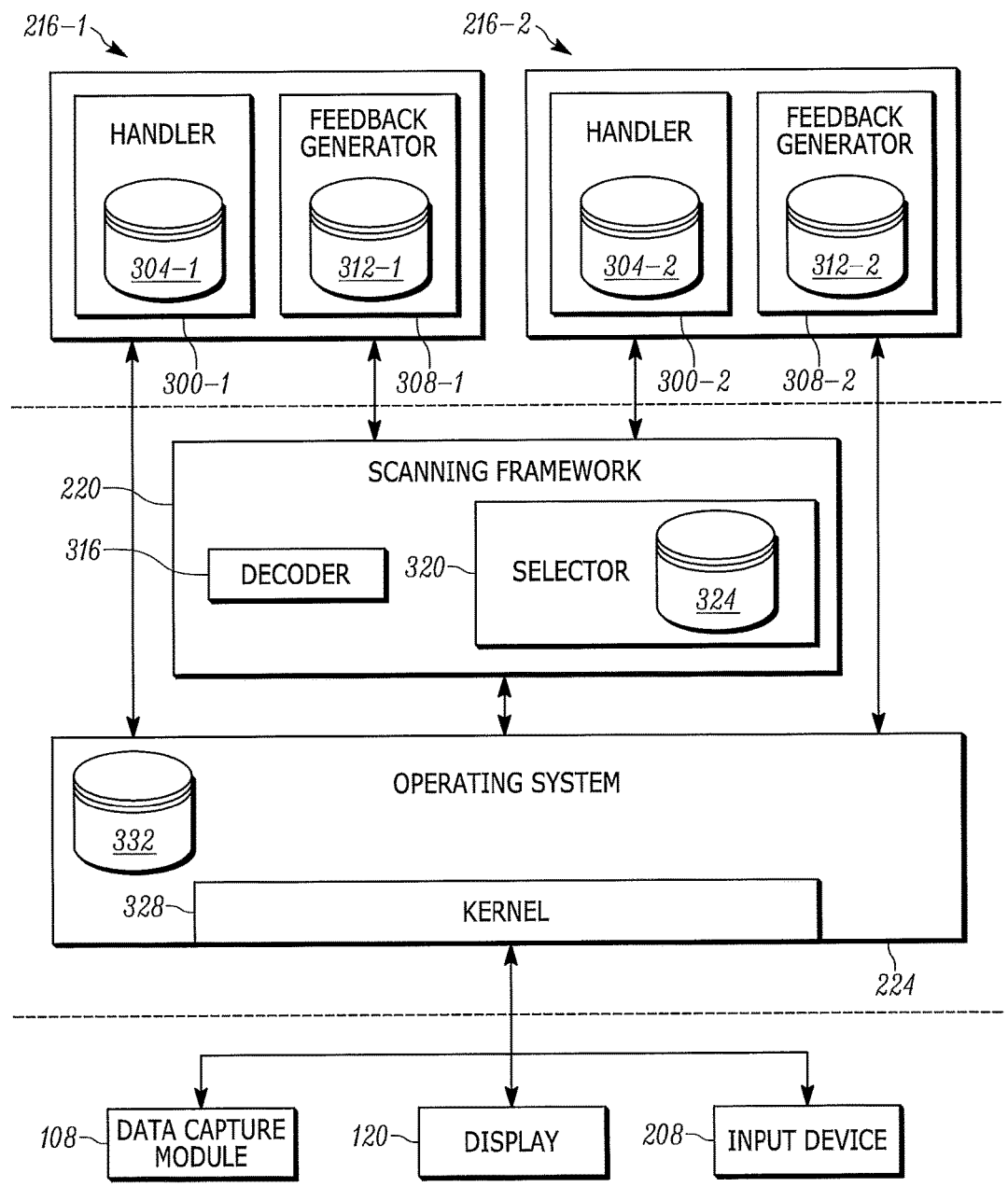
FIG. 3 is a block diagram of certain internal components of the data capture device of FIG. 1.

Turning now to FIG. 3, before describing the operation of the applications 216-1, 216-2, 220 and 224 to capture indicia and generate visual data capture feedback, the above-mentioned components will be described in greater detail. In particular, as shown in FIG. 3, the barcode handlers 216-1 and 216-2 include respective handler components 300-1 and 300-2. Each handler 300 carries out any suitable post-processing of decoded data obtained from an indicium 116, such as the above-mentioned checkout and inventory picking functions. The handlers 300 also store configuration data indicating the symbology or symbologies that the respective barcode handlers 216 are configured to handle. Thus, in the present example the handler 300-1 stores configuration data 304-1 containing a first symbology indicator corresponding to a data symbology that the handler 300-1 (and by extension the barcode handler 216-1) is configured to handle. The handler 300-2, meanwhile, stores configuration data 304-2 containing a second symbology indicator corresponding to a data symbology that the handler 300-2 (and by extension the barcode handler 216-2) is configured to handle.

The symbology indicators mentioned above can take a variety of foil is. In the present example, each symbology indicator includes a text string representing the name of the relevant symbology. Thus, in the present example the configuration data 304-1 includes the string "UPC-A" and the configuration data 304-2 includes the string "QR Code". Various other formats of configuration data, including numerical strings or index values corresponding to specific items in a list of symbologies may also be employed in the configuration data 304-1 and 304-2. As will now be apparent to those skilled in the art, each set of configuration data 304 can contain more than one symbology indicator when the corresponding barcode handler 216 is configured to handle more than one symbology.

In some examples, the configuration data 304 for each barcode handler 216 also includes additional parameters associated with the symbology indicator. For example, such additional parameters can indicate a length for decoded data (e.g. a number of characters) when the symbology indicator identifies a symbology that permits a variable length. In further examples, the additional parameters can identify an encoding mode when the symbology indicator identifies a symbology with multiple encoding modes.

The barcode handlers 216 also include respective visual data capture feedback generators 308-1 and 308-2. As will be seen below, the feedback generators 308 are configured to render visual data capture feedback on the display 120 in response to a data capture operation initiated by the data capture module 108. The feedback generators 308 include respective feedback configuration parameters 312-1 and 312-2. The feedback configuration parameters define the visual appearance of the feedback generated on the display 120. For example, the feedback configuration parameters include a type of visual data capture feedback (e.g. a full-window overlay, a frame highlight, a highlight centered on a window, and the like). The feedback configuration parameters also include, in some examples, any suitable combination of opacity indicators, color indicators, time periods for which to render the visual feedback, and the like.

In the present example, the scanning framework 220 and the operating system 224 are implemented as an intermediate layer between the barcode handlers 216 and the hardware elements of the device 100. In other words, the scanning framework 220 and the operating system 224 control access to the hardware elements of the device 100 and convey data and instructions between the hardware elements and the barcode handlers 216.

The scanning framework 220, in particular, includes a decoder 316 that receives the raw capture data from the data capture module 108 (i.e. the encoded indicium), and decodes the raw capture data. In the present example, the decoder 316 includes a plurality of decoder components each configured to decode a given symbology, enabling the decoder 316 to decode each of a plurality of symbologies. The scanning framework 220 also includes a selector 320 configured, responsive to the capture of an indicium by the data capture module 108 and the decoding of the indicium by the decoder 316, to select one or more of the barcode handlers 216. The selector 320, having made the selection, passes the decoded data to the selected applications for further processing.

The selector 320 makes the above-mentioned selection on the basis on configuration data 324. The configuration data 324 includes at least a subset of the symbology indicators stored in the application-specific configuration data described above. Thus, in some examples, the configuration data 324 includes both the first and second symbology indicators mentioned earlier.

The operating system 224 includes a variety of components (not shown) configured to manage various aspects of the operation of the device 100. For example, the operating system 224 includes a kernel or other hardware-interfacing component 328 configured to interact with the hardware elements of the device 100, including the data capture module 108, the display 120 and the input device 208. The operating system 224 is also in communication with the scanning framework 220 and the barcode handlers 216. More specifically, the operating system 224 responds to instructions from the scanning framework 220 to activate the data capture module 108, and returns the raw data obtained from the data capture module 108 to the scanning framework. Further, in some examples, the operating system 224 responds to instructions from the barcode handlers to control the operation of the display 120 (e.g. to generate the windows 124 shown in FIG. 1) and to pass input data from the input device 208 to the barcode handlers 216.

Although the scanning framework 220 and the operating system 224 are illustrated as separate components in the intermediate layer, in some examples the scanning framework 220 can be incorporated into the operating system 224.

Figure 4:
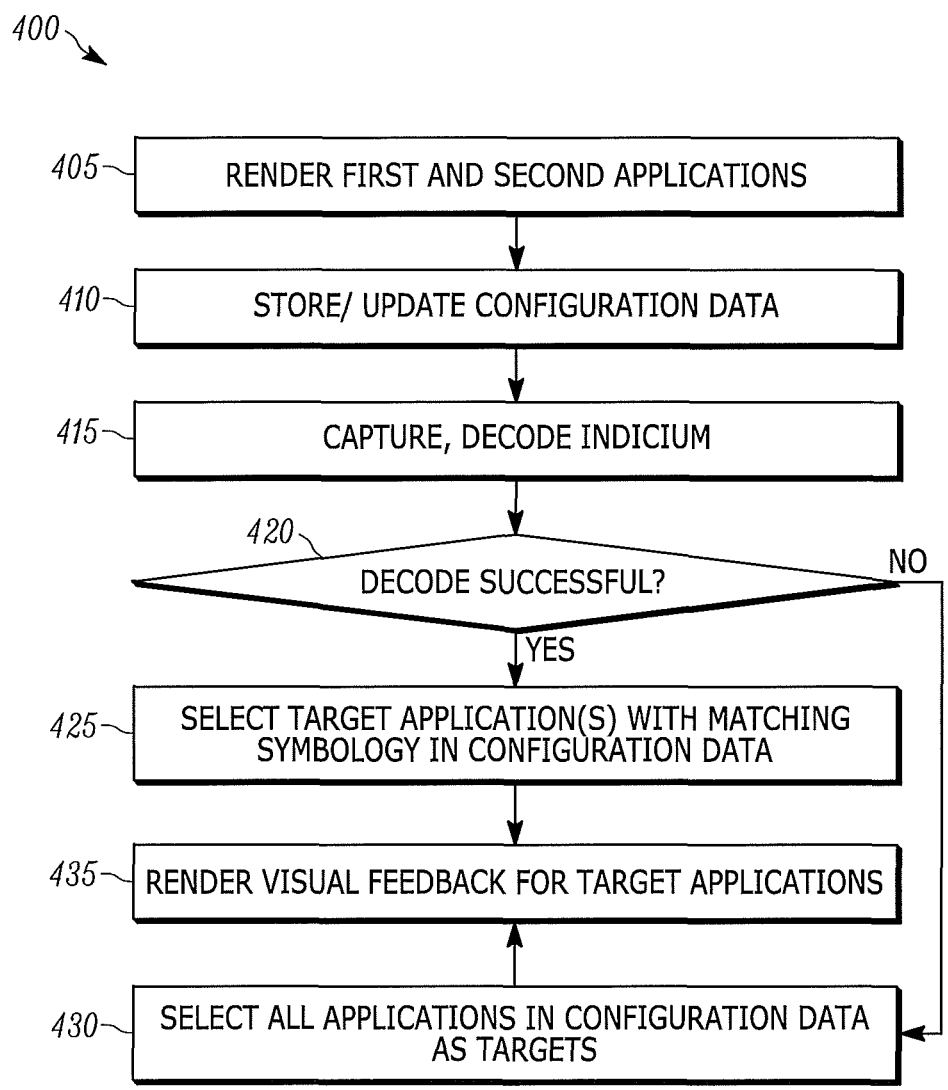
FIG. 4 is a flowchart of a method of generating visual data capture feedback in accordance with some embodiments.

Turning now to FIG. 4, a method 400 of generating visual data capture feedback is illustrated in accordance with the teachings of this disclosure. The method 400 is performed by the device 100; more specifically, portions of the method 400 are performed by certain components of the device 100, as will be discussed below.

At block 405, the device 100 renders the graphical user interfaces for the first application 216-1 and the second application 216-2 on the display 120. That is, in the illustrated embodiment, at block 405, windows such as the windows 124 shown in FIG. 1 are rendered concurrently and are both active and at least partially visible on the display 120. The rendering of the windows 124 is accomplished by way of instructions transmitted from each respective application 216 to the operating system 224. The operating system 224 stores, in the present example, window definition data 332 indicating the position and size of each active window 124 on the display 120.

At block 410, the device 100 is configured to store the above-mentioned configuration data in the memory 204. In the present example, block 410 is performed by the applications 216 and the scanning framework 220. More particularly, the applications 216 themselves store the configuration data 304. Further, each one of the applications 216 is configured, for example when it starts (i.e. begins execution by the processor 200), to retrieve and pass the configuration data 304 to the scanning framework 220 for storage in the configuration data repository 324. The configuration data 304 is passed, for example, via one or more application programming interfaces (APIs) exposed by the scanning framework 220. In some examples, the applications 216 also notify the scanning framework 220 when they cease execution, and in response the scanning framework 220 removes the corresponding configuration data from the configuration data repository 324. Thus, the configuration data 324 is an indication of which barcode handlers 216 are active, and which symbologies each active barcode handler 216 is configured to handle. The configuration data 324 also includes, in the present example, an application identifier corresponding to each of the active barcode handlers 216.

At block 415, the device 100 is configured to capture an indicium. Specifically, responsive to an input (e.g. actuation of a trigger, selection of a scan button 128 or the like), the scanning framework 220 causes the data capture module 108 to initiate a capture operation. The decoder 316 receives raw capture data from the data capture module 108, and attempts to decode the raw capture data. The results of the decoding are then passed to the selector 320 by the decoder 316. In the present example, the decoder 316 is configured to pass to the selector 320 an indication of whether or not the decoding succeeded, as well as (when available) the detected symbology of the captured indicium and the decoded data itself. As will now be apparent, when the decoding fails (e.g. due to a damaged or malformed indicium 116) the decoder 316 may not be able to detect the symbology of the captured indicium, and will not pass decoded data to the selector 320.

Responsive to the attempted decoding of the raw capture data by the decoder 316, the selector 320 is configured to select at least one target application from the applications rendered at block 405 for processing data decoded from the captured indicium. In the present example, prior to selecting a target application the selector 320 is configured to determine whether the decoding operation was successful at block 420. For example, the selector 320 is configured to determine whether the data received from the decoder 316 indicates a failed or successful decoding operation.

When the decoding operation is determined to have been successful, the performance of the method 400 proceeds to block 425, at which the selector 320 is configured to select a target application by comparing the indication of which symbology was decoded as received from the decoder 316 with the configuration data 324. The selector 320 is configured to select any applications represented in the configuration data 324 with symbology indicators that match the symbology of the successfully decoded indicium from block 415. In other words, more than one application represented in the configuration data may be selected, if more than one application indicates to the scanning framework 220 that it handles a given symbology.

When the decoding operation of block 420 is determined to have failed, however, the performance of the method 400 proceeds to block 430 rather than block 425. At block 425, the selector 320 is configured to select every application represented in the configuration data 324. Therefore, in the present example, the selector 320 is configured to select both the first and second barcode handlers 216-1 and 216-2 as target applications.

Responsive to the selection of target application(s) by the selector 320, the performance of the method 400 proceeds to block 435. At block 435, the device 100 is configured to render a visual feedback element within a target portion of the display 120 corresponding to each target application selected at blocks 425 or 430. In the present example, in which the application components of the device 100 are implemented as shown in FIG. 3, block 435 is performed by the applications 216 themselves, in cooperation with the scanning framework 220 and the operating system 224.

In particular, the selector 320 is configured to retrieve, from the configuration data 324, the application identifier corresponding to each target application selected at block 425 or block 430. The selector 320 is then configured to pass, to each of the selected applications: an indication of whether the captured indicium was successfully decoded or not; and when the decoding was successful, the decoded data in formatted in accordance with the symbology of the captured indicium. In some examples, the indication of success or failure is omitted when the decoding operation was successful, since the decoded data itself indicates that the decoding was successful.

Each selected target application 216 is configured to receive the above-mentioned indication and, if applicable, decoded data, from the selector 320. The feedback generator 308 of each target application 216 is configured, responsive to receiving the indication and/or decoded data, to retrieve the corresponding feedback configuration parameters 312. Each set of feedback configuration parameters 312 includes, in the present example, a subset of parameters for successful scans, and a subset of parameters for failed scans. In other words, the visual feedback element rendered according to the feedback configuration parameters indicates either a successful decode operation or a failed decode operation, depending on which subset of the feedback configuration parameters are employed at block 435.

Thus, in an example performance of method 400 in which the application 216-1 alone is selected as the target application for a successful capture of the indicium 116-2, the feedback generator 308-1 retrieves the subset of the feedback configuration parameters 312-1 for successful scans at block 435, and issues an instruction to the operating system 224 to generate (e.g. via the kernel 328) the visual feedback element on the display 120 according to the retrieved subset of feedback configuration parameters.

In some examples, the instruction generated by the feedback generator 308-1 includes relative position and size data defining the position and size of the visual feedback element in relation to the position and size of the window 124-1 corresponding to the application 216-1. For example, the instruction can include position and size data indicating that the visual feedback element is to be rendered over the entire window 124-1, irrespective of the position of the window 124-1. In order to execute such an instruction, the operating system 224 retrieves the position and size of the window 124-1 corresponding to the application 216-1 from the window definition data 332.

In other examples, the instruction generated by the feedback generator 308-1 includes absolute position and size data defining the position and size of the visual feedback element on the display 120. In such examples, the feedback generator 308-1 is configured to retrieve the position and size of the window 124-1 from the operating system 224, and generate display coordinates delimiting the visual feedback element.

Figures 5A, 5B:
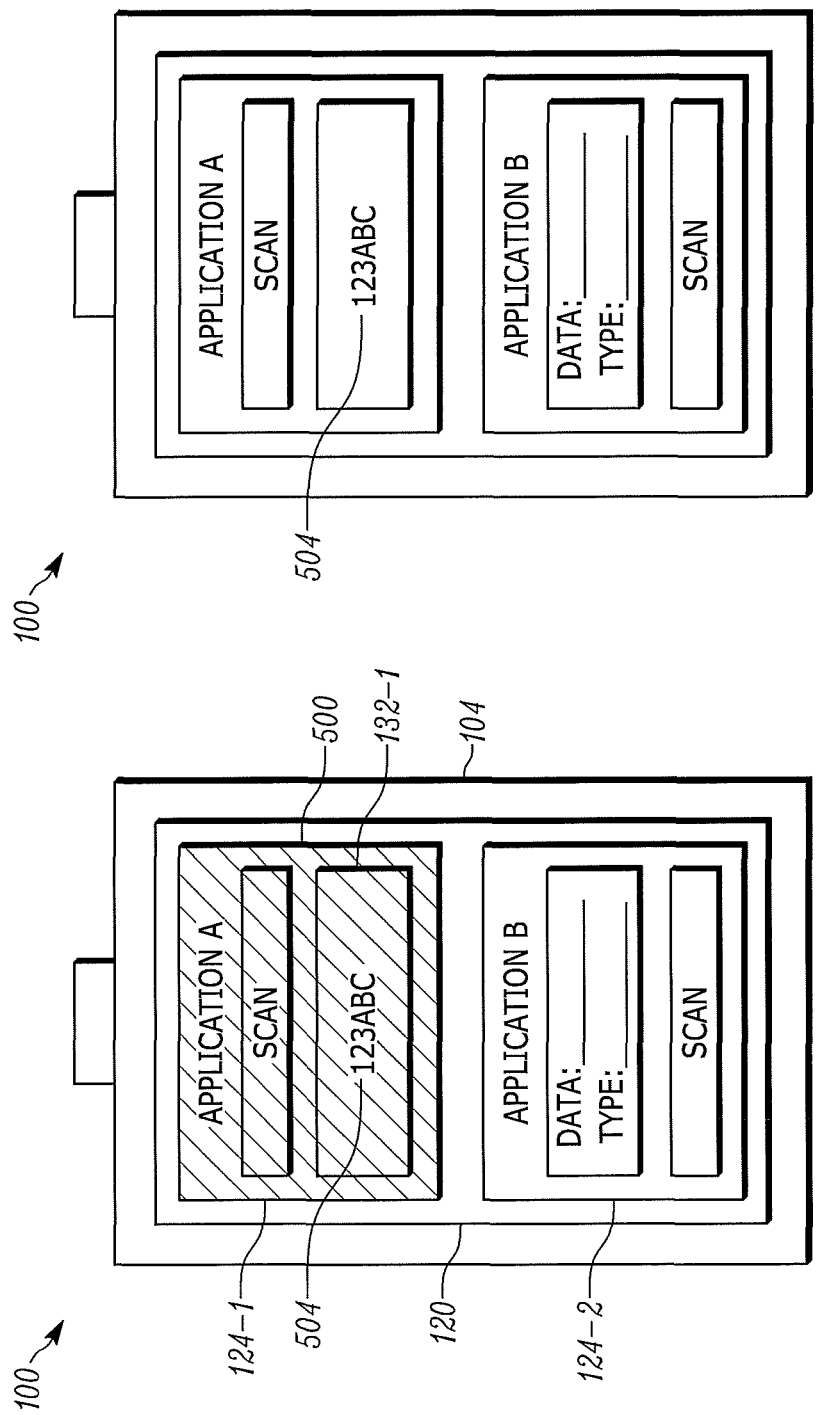
FIGS. 5A-5B are schematics of visual data capture feedback generated by the data capture device of FIG. 1 in accordance with some embodiments.

A variety of feedback configuration parameters 312 are contemplated, resulting in the generation of various different visual feedback elements. Referring to FIG. 5A, an example visual feedback element 500 is shown rendered over substantially the entire area of the window 124-1. The visual feedback element 500 is translucent, for example as a result of an opacity parameter in the feedback configuration parameters 312-1 that is below 100%. Further, as seen in FIG. 5A, the visual feedback element 500 is distinct from a decoded data string 504 ("123abc"), which is also rendered within the window 124-1. The visual feedback element 500 has any suitable color, pattern, image or the like. In one embodiment, displaying the visual feedback element 500 includes bringing a corresponding application window into the foreground (e.g. if such window was initially partially visible) in addition to or as an alternative to displaying a predetermined color, pattern, and/or image. In addition, as seen in FIG. 5B, the visual feedback element 500 may be removed from the display 120 after a configurable period of time specified in the feedback configuration parameters 312-1. Following removal of the visual feedback element 500, the decoded data string 504 remains on the display 120 in the illustrated example.

FIG. 6A depicts another example visual feedback element 600 rendered on the display 120 along with a decoded data string 604 and corresponding to the application 216-1. In particular, the visual feedback element 600 includes a frame rendered around the perimeter of the window 124-1. The feedback configuration parameters 312-1 in the present example specify the color, opacity and thickness of the frame 600. As in the example of FIGS. 5A-5B, the frame 600 may also be removed from the display after a configurable time period specified in the feedback configuration parameters 312-1.

FIG. 6B depicts a further example visual feedback element 608 rendered on the display 120 along with the decoded data string 604. The visual feedback element 608 includes both a frame as shown in FIG. 6A, and a translucent overlay as shown in FIG. 5A. The frame and the overlay have the same expiry times (after which they are removed from the display 120) in some examples. In other examples, the feedback configuration parameters specify different expiry time periods for each of the frame and the overlay.

FIGS. 7A and 7B depict example visual feedback elements including example indications of the success of failure of a scan. For example, FIG. 7A depicts a visual feedback element 700 including an overlay as shown in FIG. 5A, and a textual indication 704 of a successful scan at a position within the overlay defined by the feedback configuration parameters 312-1. FIG. 7B depicts two example visual feedback elements 708 and 712, generated by the applications 216-1 and 216-2 respectively, in response to a failed decode operation. The visual feedback elements 708 and 712 employ a different color, pattern or both from the previously illustrated visual feedback elements, to distinguish feedback for successful scans from feedback for failed scans. In addition, the visual feedback element 708 includes a textual indication 716 that the scan failed.

Figure 8:
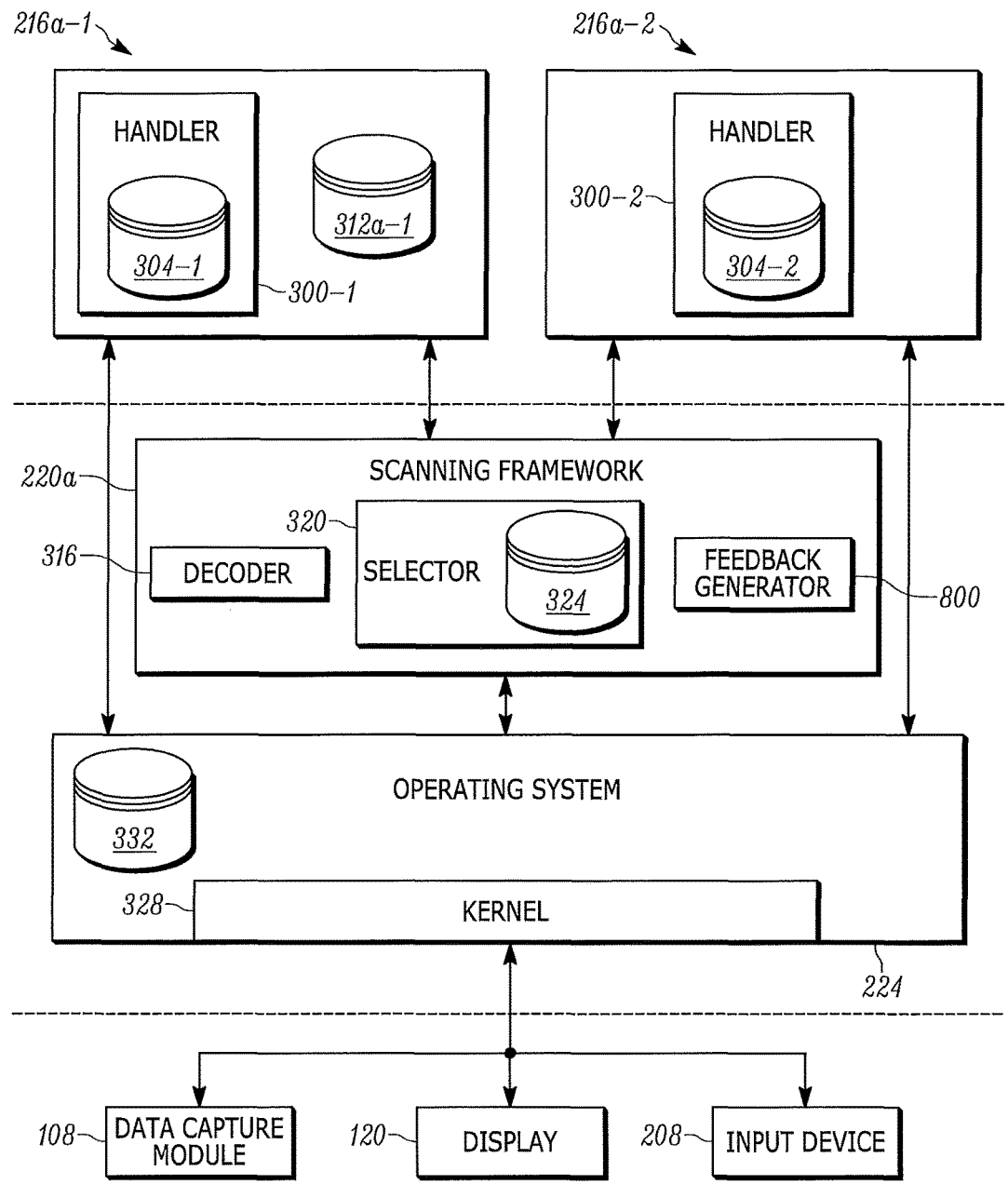
FIG. 8 is a block diagram of certain internal components of the data capture device of FIG. 1 in accordance with other embodiments.

Further variations to the above examples are contemplated. For example, the visual feedback elements may be generated by an intermediate application such as the scanning framework 220 rather than by the barcode handlers 216. Referring to FIG. 8, an additional example component architecture for the device 100 is illustrated. In the architecture of FIG. 8, the operating system 224 and its components are as described above. The scanning framework 220a is as described above in connection with the scanning framework 220, with the exception that the scanning framework 220a also includes a feedback generator 800. In addition, the applications 216a-1 and 216a-2 are as described in connection with the applications 216-1 and 216-2, but omit the feedback generators 308. In addition, the applications 216a can omit, as is shown in connection with the application 216a-2, the feedback configuration parameters 312. Thus, only the application 216a-1 is shown as including feedback configuration parameters 312a-1.

In operation, the performance of blocks 405-430 of the method 400 in this example are as described earlier. However, at block 435, the visual feedback elements are rendered by the scanning framework 220a, and in particular the feedback generator 800, instead of by the feedback generators 308 discussed earlier. In particular, the feedback generator 800 includes default feedback configuration parameters. The feedback generator 800 is configured to determine whether each target application includes application-specific feedback configuration parameters. When the determination is negative (as with the application 216a-2) the feedback generator retrieves the window position and size of the target application from the window definition data 332, and renders the visual feedback element in accordance with the default parameters. When the determination is affirmative, however (as is the case with the application 216a-1), the feedback generator 800 retrieves the feedback configuration parameters 312a-1 and renders the visual feedback element in accordance with the retrieved application-specific parameters instead of the default parameters.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of generating visual data capture feedback at a data capture device, the method comprising:
   rendering a first application and a second application on respective portions of a display of the data capture device, each of the first and second applications configured to process data decoded from captured indicia;
   storing, in a memory of the capture device, configuration data including:
   a first symbology indicator corresponding to a data symbology handled by the first application;
   a second symbology indicator corresponding to a data symbology handled by the second application; and
   visual feedback configuration data including a first feedback parameter corresponding to the first application, and a second feedback parameter corresponding to the second application, wherein the first feedback parameter includes a position and size of the first portion of the display, and the second feedback parameter includes a position and size of the second portion of the display;
   responsive to capturing an indicium, selecting based on the configuration data a target application from the first application and the second application for processing data decoded from the captured indicium in accordance with one of the first and second data symbology; and
   rendering a visual feedback element on the display within a target portion of the display corresponding to the selected target application, wherein rendering the visual feedback element includes retrieving the one of the first and second feedback parameters corresponding to the selected application.

2. The method of claim 1, further comprising:
   responsive to capturing the indicium and prior to selecting the target application, determining whether decoded data has been successfully obtained from the indicium; and
   when the determination is affirmative, rendering the decoded data and the visual feedback element within the target portion of the display, the visual feedback element indicating a successful decode operation.

3. The method of claim 2, further comprising:
   when the determination is negative, selecting the first application and the second application as the target application; and
   rendering the visual feedback element on the display within each of the portions, the visual feedback element indicating a failed decode operation.

4. The method of claim 1, wherein rendering the visual feedback element comprises retrieving the one of the first and second feedback parameters via execution of an intermediate application.

5. The method of claim 1, wherein selecting the one of the first and second applications comprises determining a data symbology of the indicium, and comparing the data symbology of the indicium to the configuration data.

6. The method of claim 1, further comprising:
rendering a selectable capture element on the display with the first and second applications; and
responsive to receiving a selection of the capture element, initiating the capture of an indicium and the selection of one of the first and second applications.

7. The method of claim 1, the visual feedback element comprising one of a translucent overlay on the target portion of the display, and a frame overlay on a perimeter of the target portion of the display.

8. A data capture device, comprising:
a data capture module;
a display;
a first handler configured to render a first application on a first portion of the display, and a second handler configured to render a second application on a second portion of the display, each of the first and second applications configured to process data decoded from captured indicia;
a memory storing configuration data including:
　a first symbology indicator corresponding to a data symbology handled by the first application;
　a second symbology indicator corresponding to a data symbology handled by the second application; and
　visual feedback configuration data including a first feedback parameter corresponding to the first application, and a second feedback parameter corresponding to the second application, wherein the first feedback parameter includes a position and size of the first portion of the display, and the second feedback parameter includes a position and size of the second portion of the display;
a selector configured, responsive to the capture of an indicium, to select based on the configuration data a target application from the first application and the second application for processing data decoded from the captured indicium in accordance with one of the first and second data symbology; and
a feedback generator configured to render a visual feedback element on the display within a target portion of the display corresponding to the selected target application, wherein rendering the visual feedback element includes retrieving the one of the first and second feedback parameters corresponding to the selected application.

9. The data capture device of claim 8, the selector further configured, responsive to the capture of the indicium and prior to selecting the target application, to determine whether decoded data has been successfully obtained from the indicium; and
the feedback generator further configured, when the determination is affirmative, to render the decoded data and the visual feedback element within the target portion of the display, the visual feedback element indicating a successful decode operation.

10. The data capture device of claim 9, the selector further configured, when the determination is negative, to select the first application and the second application as the target application; and
the feedback generator further configured to render the visual feedback element on the display within each of the portions, the visual feedback element indicating a failed decode operation.

11. The data capture device of claim 8, further comprising an intermediate application including the feedback generator.

12. The data capture device of claim 8, the selector further configured to select the one of the first and second applications by determining a data symbology of the indicium, and comparing the data symbology of the indicium to the configuration data.

13. The data capture device of claim 8, the handlers each further configured to render a selectable capture element on the display with the first and second applications; and
each handler configured, responsive to receiving a selection of the capture element, to initiate the capture of an indicium and the selection of one of the first and second applications.

14. The data capture device of claim 8, the visual feedback element comprising one of a translucent overlay on the target portion of the display, and a frame overlay on a perimeter of the target portion of the display.

* * * * *